(12) United States Patent
Li

(10) Patent No.: US 6,301,422 B1
(45) Date of Patent: Oct. 9, 2001

(54) LARGE EFFECTIVE AREA FIBER HAVING A LOW TOTAL DISPERSION SLOPE

(75) Inventor: Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/528,387

(22) Filed: Mar. 20, 2000

Related U.S. Application Data

(60) Provisional application No. 60/131,388, filed on Apr. 28, 1999.

(51) Int. Cl.$^7$ .................................................. G02B 6/02
(52) U.S. Cl. ..................... 385/127; 385/123; 385/126; 385/124; 385/141
(58) Field of Search ................................... 385/123, 124, 385/125, 126, 127, 128, 141

(56) References Cited

U.S. PATENT DOCUMENTS

| | | | |
|---|---|---|---|
| 5,553,185 | * 9/1996 | Antos et al. | 385/127 |
| 5,649,044 | * 7/1997 | Bhagavatula | 385/124 |
| 5,675,688 | * 10/1997 | Nouchi et al. | 385/124 |
| 5,675,690 | * 10/1997 | Nouchi et al. | 385/127 |
| 5,721,800 | 2/1998 | Kato et al. | 385/127 |
| 5,781,684 | 7/1998 | Liu | 385/124 |
| 5,852,701 | 12/1998 | Kato et al. | 385/127 |
| 6,009,221 | * 12/1999 | Tsuda | 385/123 |
| 6,072,929 | 6/2000 | Kato et al. | 385/123 |

FOREIGN PATENT DOCUMENTS

| | | | |
|---|---|---|---|
| 0 909 964 A1 | 4/1999 | (EP) | 385/123 X |
| 0 851 245 A2 | 3/2000 | (EP) | 385/123 X |
| 0 883 002 A1 | 8/2000 | (EP) | 385/123 X |

OTHER PUBLICATIONS

Nouchi et. al., "New Dispersion Shifted Fiber . . . ", 22nd Eur. Conf. on Optical Communications ECOC 1996 OSLO pp. 49–51.*

Nouchi et al., "New Dispersion Shifted Fiber with Effective Area Larger than 90 MUM2", Proceedings of the European Conference on Optical Communication, 1996, pp. 1.49–1.52.

Nouichi P., "Maximum Effective Area for Non–Zero Dispersion–Shifted Fiber", Optical Fiber Communication Conference, OFC '98, Technical Digest, vol. 2 Feb., 1998, pp. 303–304.

Belov, A.V., "Profile Structure of Single–Mode Fibers with Low Non–Linear Properties for Long–Haul Communication Lines", Optics Communications, vol. 161, No. 4–6, Mar., 1999, pp. 212–216.

Liu, et al., "Single–Mode Dispersion Shifted Fibers with Effective area over 100um2", 24$^{th}$ European Conference on Optical Communications, ECOC '98, vol. 1, pp. 41–42.

Hattori, et al., "Fiber Designs with Significantly Reduced Nonlinearity for Very Long Distance Transmission", Applied Optics, US, Optical Society of America, vol. 37, No. 15, May 1998, pp. 3190–3197.

* cited by examiner

Primary Examiner—Brian Healy
(74) Attorney, Agent, or Firm—William J. Chervenak

(57) ABSTRACT

Disclosed is a single mode optical waveguide fiber having a relatively large effective area and good bend resistance. The waveguide fiber is characterized by a segmented core having a central segment and at least one annular segment surrounding the central segment. At least one segment has a negative relative index where the reference index is taken as the minimum index of the core. The total dispersion of the fiber is positive for wavelengths above about 1500 nm, dispersion slope is typically less than about 0.08 ps/nm$^2$-km, and induced attenuation under pin array bend testing is typically less than 5 dB/km.

27 Claims, 7 Drawing Sheets

LARGE EFFECTIVE AREA FIBER HAVING A LOW TOTAL DISPERSION SLOPE

This application claims the benefit of U.S. Provisional Patent Application No. 60/131,388, filed Apr. 28, 1999, abandoned.

BACKGROUND OF THE INVENTION

1. Field of the Invention

The invention is directed to a single mode optical waveguide fiber for use in telecommunication systems. More particularly, the waveguide fiber reduces non-linear dispersion effects and provides an expanded window of operating wavelengths.

2. Technical Background

A waveguide having large effective area reduces non-linear optical effects, including self phase modulation, four wave mixing, cross phase modulation, and non-linear scattering processes, all of which can cause degradation of signals in high power systems. In general, a waveguide fiber having a segmented core can provide a large effective area while maintaining other fiber properties within desired ranges. A core having multiple segments, each characterized by a refractive index profile, a relative index, and a radius, has a flexibility of design sufficient to meet an extended list of desired functional properties.

In U.S. Pat. No. 5,781,684, incorporated herein by reference as though fully set forth in its entirety, there is disclosed and described a segmented core waveguide fiber having a large effective area. A feature of the segmented core of that waveguide fiber is that at least one of the segments has a negative relative refractive index.

The present application discloses and describes segmented core waveguide fibers, in which at least one segment has a negative relative index, that provide a unique set of functional properties.

Definitions

The following definitions are in accord with common usage in the art.

The radii of the segments of the core are defined in terms of the index of refraction of the material of which the segment is made. A particular segment has a first and a last refractive index point. A central segment has an inner radius of zero because the first point of the segment is on the centerline. The outer radius of the central segment is the radius drawn from the waveguide centerline to the last point of the refractive index of the central segment. For a segment having a first point away from the centerline, the radius from the waveguide centerline to the location of this first refractive index point is the inner radius of that segment. Likewise, the radius from the waveguide centerline to the location of the last refractive index point of the segment is the outer radius of that segment.

The segment radii may be conveniently defined in a number of ways. In this application, radii are defined in accord with the figures, described in detail below.

The definitions of segment radius and refractive index, used to describe refractive index profile, in no way limit the invention. Definitions are given herein because in carrying out model calculations, the definitions must be used consistently. The model calculations set forth in the tables below are made using the geometrical definitions labeled in the figures and described in the detailed description.

The effective area is generally defined as, $$A_{eff}=2\pi(\int E^2 r dr)^2/(\int E^4 r dr),$$

where the integration limits are 0 to ∞, and E is the electric field associated with the propagated light. An effective diameter, $D_{eef}$, may be defined as, $$A_{eff}=\pi(D_{eff}/2)^2.$$

The relative index of a segment, Δ%, as used herein, is defined by the equation, $$\Delta\%=100\times(n_i-n_c)/n_c,$$

where $n_i$ is the maximum refractive index of the index profile segment denoted as i, and $n_c$, the reference refractive index, is taken to be the minimum index of the clad layer. Every point in a segment has an associated relative index. The maximum relative index is used to conveniently characterize a segment whose general shape is known.

The term refractive index profile or simply index profile is the relation between Δ% or refractive index and radius over a selected segment of the core. The term alpha profile refers to a refractive index profile that may be expressed by the equation, $$n(r)=n_0(1-\Delta[r/a]^\alpha),$$

where r is core radius, Δ is defined above, a is the last point in the profile segment, the value of r at the first point of the α-profile is chosen in accord with the location of the first point of the profile segment, and α is an exponent which defines the profile shape. Other index profiles include a step index, a trapezoidal index and a rounded step index, in which the rounding is usually due to dopant diffusion in regions of rapid refractive index change.

Total dispersion is defined as the algebraic sum of waveguide dispersion and material dispersion. Total dispersion is sometimes called chromatic dispersion in the art. The units of total dispersion are ps/nm-km.

The bend resistance of a waveguide fiber is expressed as induced attenuation under prescribed test conditions. A bend test referenced herein is the pin array bend test that is used to compare relative resistance of waveguide fiber to bending. To perform this test, attenuation loss is measured for a waveguide fiber with essentially no induced bending loss. The waveguide fiber is then woven in a serpentine path through the pin array and attenuation again measured. The loss induced by bending is the difference between the two measured attenuation values. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the serpentine woven waveguide fiber conform to the portions of the pin surface at which there is contact between fiber and pin.

Another bend test referenced herein is the lateral load test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

SUMMARY

The invention relates to a single mode optical waveguide fiber having a segmented core. Each of the segments is described by a refractive index profile, a relative refractive index percent, and inner and outer radii. At least one of the segments has a negative relative refractive index percent. The index profile, relative index, and radii of the segments are chosen to provide a single mode optical waveguide fiber having an effective area, $A_{eff}$, greater than about 70 $\mu m^2$, a total dispersion slope less than about 0.09 ps/nm$^2$-km, and positive total dispersion for signals of wavelength greater than about 1500 nm.

In a preferred embodiment, the total dispersion slope is less than about 0.08 ps/nm$^2$-km. A further embodiment has this lower dispersion slope while maintaining bend induced loss in the pin array test less than about 12.0 dB/km a preferably less than about 8.0 dB/km. For comparison purposes, a pin array bend loss of about 12.0 dB/km is characteristic of conventional step index single mode fibers having effective area of about 70 $\mu m^2$.

In another preferred embodiment, the pin array induced loss is less than about 5.0 dB/km. In addition, embodiments having induced loss due to lateral load bending less than about 1.2 dB/km and preferably less than about 0.6 dB/km are disclosed and described.

Reference will now be made in detail to the present preferred embodiments of the invention, examples of which are illustrated in the accompanying drawings. Wherever possible, the same reference numbers will be used throughout the drawings to refer to the same or like parts. Exemplary embodiment of the segmented core refractive index profile of the present invention is shown in each of the figures.

DETAILED DESCRIPTION OF THE INVENTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

The segmented core optical waveguide fiber described and disclosed herein has a central segment and at least one annular segment surrounding and in contact with the central segment. At least one of the segments has a negative relative refractive index. This segmented core waveguide fiber has an effective area greater than about 70 $\mu m^2$ to reduce or eliminate non-linear dispersion of signals propagating in the fiber. At the same time, the total dispersion slope is low over an extended wavelength range. The examples set forth here generally have a total dispersion slope less than about 0.09 ps/nm$^2$-km. In addition, the induced loss due to pin array bending and lateral load bending is maintained below about 12 dB/km and 1.2 dB/km, respectively. The tables that follow show certain embodiments have respective pin array and lateral load bend loss less than about 8 dB/km and 0.6 dB/km, respectively. Even lower bending induced loss is illustrated in the examples that follow.

Figure 1:
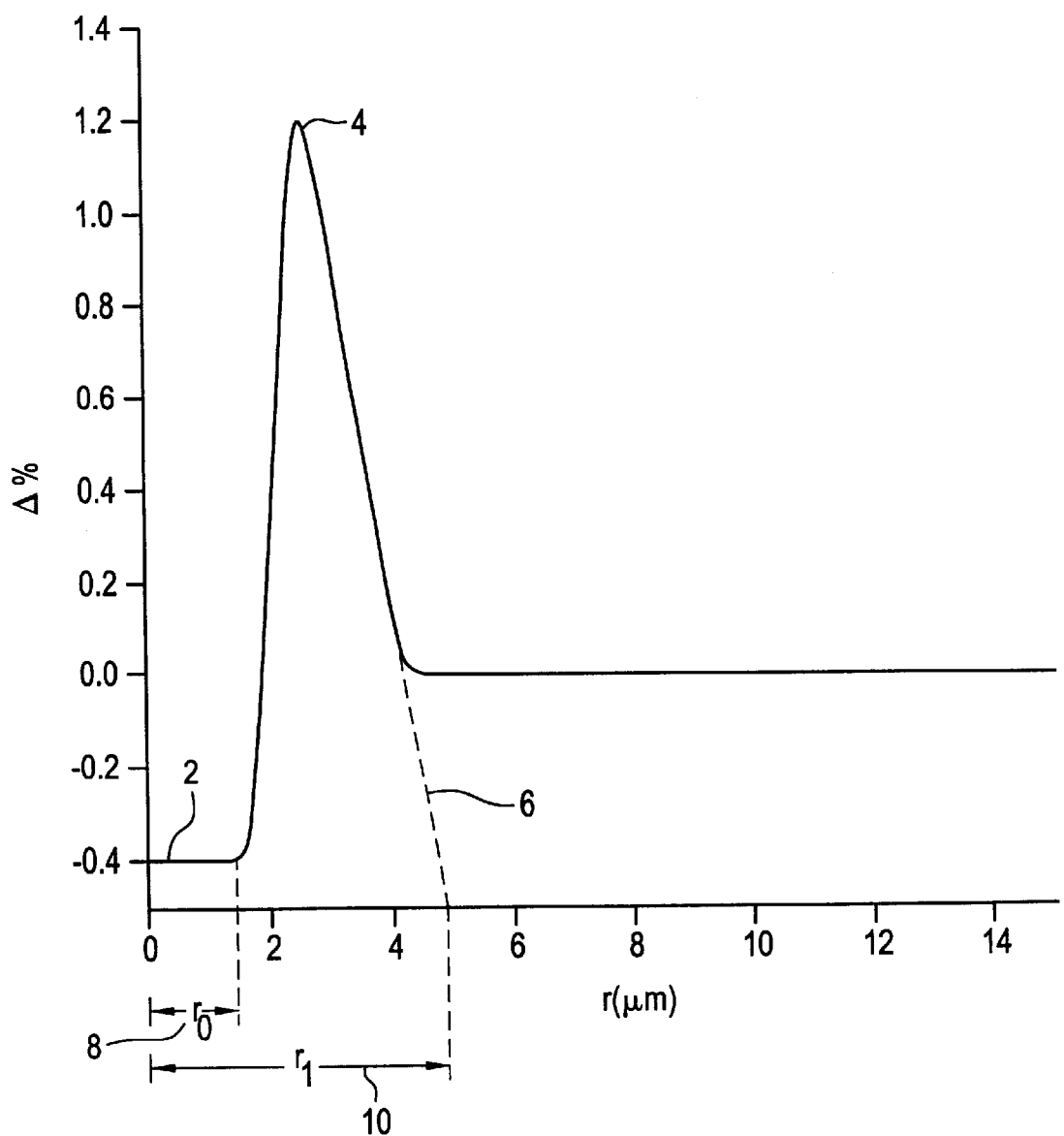
FIG. 1 is an example of a waveguide fiber refractive index profile having a two segment core and a negative relative index in the central segment.

An embodiment having a core including two segments is shown in FIG. 1. The central segment 2 has a negative relative index, $\Delta_0\%$, of about −0.4%. The surrounding annular segment 4 is an α-profile for which α is about 1 having relative index $\Delta_1\%$ of about 1.2. The outer radius 8 of the central segment 2, $r_0$, is about 1.75 $\mu$m. The radius 8, $r_0$, is also the inner radius of the first annular segment. This convention will be used consistently in all of the drawings. The radius 8 is defined as the intersection of the central segment and the first annular segment. In this case, the intersection point is the first point at which the relative index begins to increase. The outer radius 10 of the first annular segment 4, $r_1$, is about 4.75 $\mu$m and is defined as the intersection of the extrapolated descending portion of the index profile 6 with the horizontal axis, defined as the axis through the lowest or the most negative point or points of the refractive index profile. The properties of the waveguide fiber of FIG. 1, calculated using a computer model, are given in Table 1.

TABLE 1

| | |
|---|---|
| Zero-dispersion wavelength (nm) | 1497.5 |
| Dispersion slope (ps/nm$^2$ · km) | 0.0876 |
| Mode field diameter ($\mu$m) | 7.69 |
| Effective area ($\mu m^2$) | 79.3 |
| Cable cutoff wavelength (nm) | 1280 |
| Pin array bending loss (dB/km) | 0.0 |
| Lateral load bending loss (dB/m) | 0.08 |

In this example, the effective area is nearly 80 $\mu m^2$ and the pin array bend loss and the lateral load bend loss are small. In addition to excellent performance, an advantage of this design is its simplicity.

The profile of FIG. 1 is a member of a group of profiles that exhibit similar performance to that set forth in Table 1.

The group of refractive index profiles in accord with FIG. 1 having substantially similar functional parameters have relative indexes in the respective ranges of about −0.05% to −0.8% for central segment 2, $\Delta_0\%$, and of about 0.8% to 1.5% for 4, $\Delta_1\%$, the first annular segment. The corresponding radii of the group are in the respective ranges of about 0.5 μm to 2 μm for 8, $r_0$, and of about 3.5 μm to 5.5 μm for 10, $r_1$.

Figure 2:
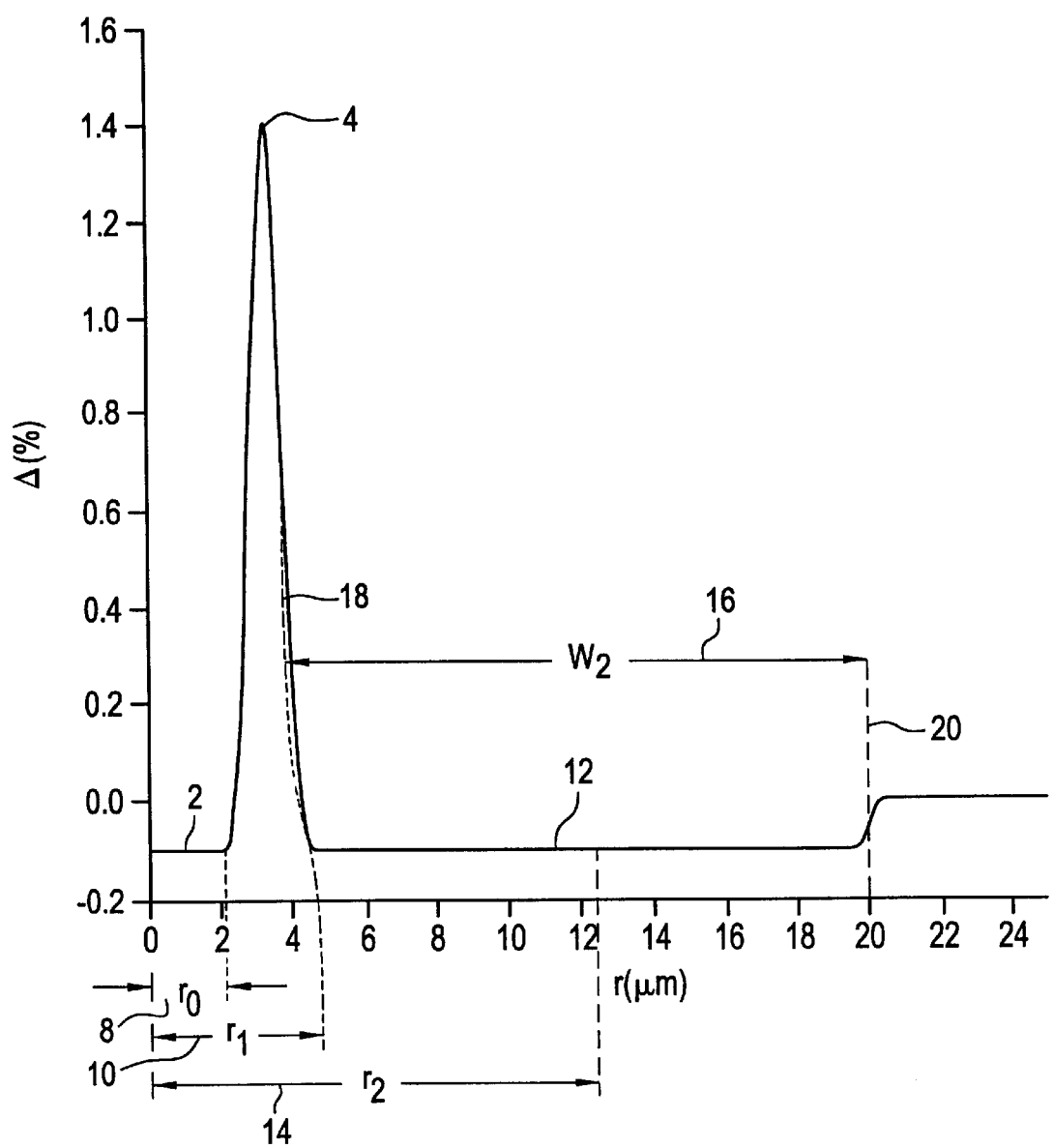
FIG. 2 is an example of a waveguide fiber refractive index profile having a three segment core and a negative relative index in the central segment and in the second annular segment.

Another embodiment of the invention is shown in FIG. 2. In this example, central segment 2 and second annular segment 12 each have a negative relative index, $\Delta_0\%$ and $\Delta_2\%$, of about −0.1%. The first annular segment 4 has relative index, $\Delta_1\%$ of about 1.4%. The radius of the first segment 2 is about 2 μm. The outer radius of the first annular segment is about 4.5 μm. For those profiles having more than one annular segment, the outermost annular segment is characterized by a radius 14 drawn from the fiber centerline to the geometric center of the segment. The geometrical center is determined by dividing in half the distance 16 between the vertical lines 18 and 20 drawn from the half magnitude relative index points of the index profiles bounding the outermost annular segment. Magnitude is measured from the horizontal line defined by lowest or the most negative $\Delta\%$ as described above. The distance 16 is the width $w_2$ of the second annular segment. Table 2 sets forth the calculated properties of the FIG. 2 refractive index profile.

TABLE 2

| | |
|---|---|
| Zero-dispersion wavelength (nm) | 1490.1 |
| Dispersion slope (ps/nm² · km) | 0.0788 |
| Mode field diameter (μm) | 8.0 |
| Effective area (μm²) | 76.6 |
| Cable cutoff wavelength (nm) | 1200 |
| Pin array bending loss (dB/km) | 0.2 |
| Lateral load bending loss (dB/m) | 0.101 |

As before, a group of index profiles made in accord with FIG. 2 have substantially the same properties as set forth in Table 2. The relative index ranges and radius ranges for the group made in accord with FIG. 2 are, $\Delta_0\%$ in the range of about −0.05% to −0.2%, $\Delta_1\%$ in the range of about 1.3% to 1.5%, $\Delta_2\%$ in the range of about −0.05% to −0.2%, radius 8, $r_0$, in the range of about 1 μm to 3 μm, the outer radius of the first annular segment 10, $r_1$, in the range of about 4 μm to 6 μm, the center radius 14, $r_2$, of the second annular segment in the range of about 11.5 μm to 12.5 μm, and the width of the second annular segment 16, $W_2$, in the range of about 15 μm to 17 μm.

Figure 3:
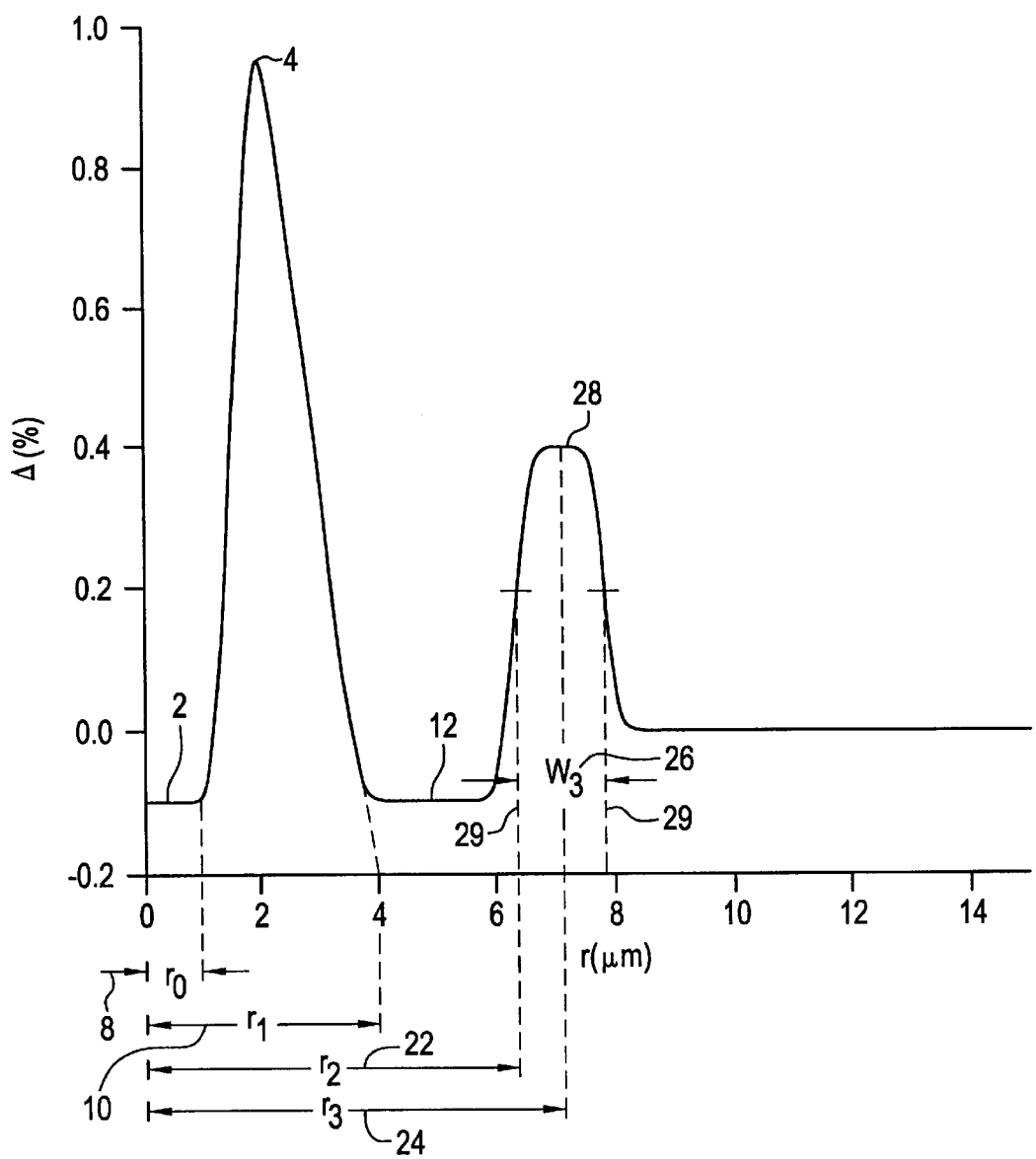
FIG. 3 is an example of a waveguide fiber refractive index profile having a four segment core and a negative relative index in the central segment and in the second annular segment.

The embodiment shown in FIG. 3 includes three annular segments 4, 12, and 28 surrounding central segment 2. The respective relative indexes follow the inequality, $\Delta_1\% > \Delta_3\% > \Delta_2\% \geq \Delta_0\%$. This refractive index profile is described by first segment 2 having radius 8, $r_0$, drawn from the centerline to the point at which the relative index begins to increase, as is stated above. The outer radius of the first annular segment 10, $r_1$, again is the intersection of the extrapolation of the descending portion of the first annular segment profile with the horizontal axis. The horizontal axis is described above. The outer radius 22 of the second annular segment is measured from the fiber centerline to the vertical line depending from the half maximum relative index point of the ascending portion of third annular segment 28. The half maximum point is determined using the clad layer, i.e., $\Delta\%=0$, as reference. For example, in FIG. 3, third annular segment 28 has a relative index $\Delta_3\%$ of about 0.4%, thus relative to the $\Delta\%=0$ of the clad layer. The $\Delta_3\%$ magnitude is about 0.4%. Then, the vertical lines 29 depend from the 0.2% points, which are half the maximum magnitude of $\Delta_3\%$. The third, i.e., the last, annular segment 28 has center radius 24, $r_3$. The width of the third annular segment is 26, $w_3$.

Table 3 shows the parameters of a waveguide fiber made in accord with FIG. 3. The refractive index profile has $\Delta_0\%$ of about −0.1%, $\Delta_1\%$ of about 0.95%, $\Delta_2\%$ of about −0.1%, and $\Delta_3$ of about 0.4%. The respective radii are, $r_0$ about 1 μm, $r_1$ about 4 μm, $r_2$ about 6.3 μm, $r_3$ about 7 μm, and $W_3$ about 1.6 μm.

TABLE 3

| | |
|---|---|
| Zero-dispersion wavelength (nm) | 1499 |
| Dispersion slope (ps/nm² · km) | 0.073 |
| Mode field diameter (μm) | 9.06 |
| Effective area (μm²) | 73.0 |
| Cable cutoff wavelength (nm) | 1155 |
| Pin array bending loss (dB/km) | 4.4 |
| Lateral load bending loss (dB/m) | 0.328 |

The group of profiles in accord with FIG. 3 which provide substantially the same fiber parameters as set forth in Table 3 have respective relative indexes $\Delta_0\%$ in the range of about −0.05% to −0.2%, $\Delta_1\%$ in the range of about 0.85% to 1.15%, $\Delta_2\%$ in the range of about −0.05% to −0.2%, and $\Delta_3\%$ in the range of about 0.3% to 0.5%. The respective radial dimensions are $r_0$ in the range of about 0.05 μm to 1.5 μm, the outer radius of the first annular segment $r_1$ in the range of about 3 μm to 5 μm, the outer radius of the second annular segment in the range of about 5.5 μm to 7.0 μm, the center radius of the third annular segment in the range of about 6.25 μm to 8.25 μm, and the width of the third annular segment $W_3$ in the range of about 1.5 μm to 2.5 μm.

Figure 4:
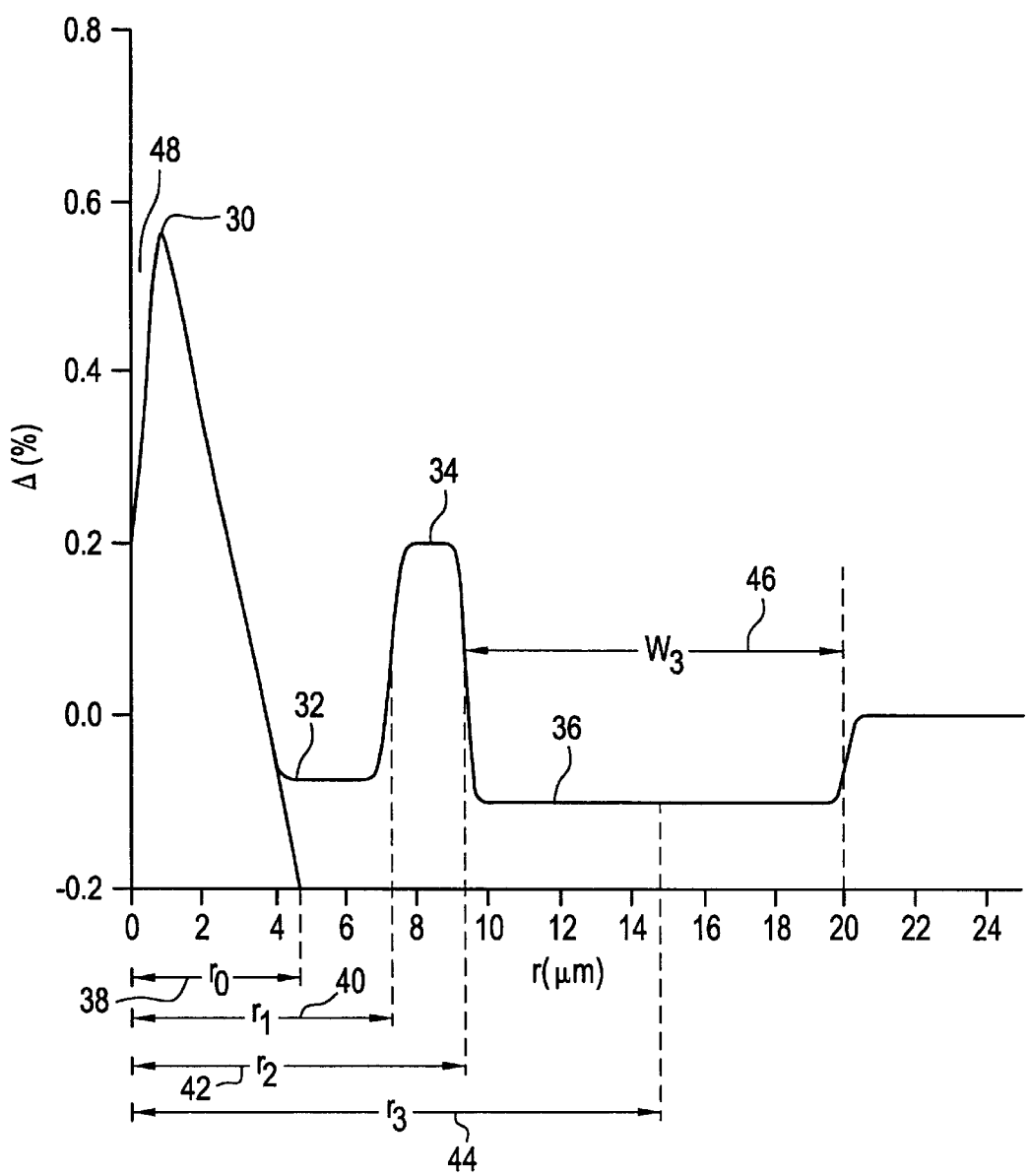
FIG. 4 is an example of a waveguide fiber refractive index profile having a four segment core and a negative relative index in the first annular segment and in the third annular segment.

The embodiment of the invention shown in FIG. 4 has three annular segments and respective relative indexes 30, 32, 34 and 36 that follow the inequality, $\Delta_0\% > \Delta_2\% > \Delta_1\% > \Delta_3\%$. Two of the annular segments have negative relative index. The centerline indent 48, usually due to dopant diffusion, can be eliminated in the preform deposition step. However, one may conveniently compensate for diffusion in the model calculations and in manufacturing of the waveguide fiber. Typically the indent 48 does not have a large impact on waveguide fiber performance and may be compensated by adjusting $\Delta_0\%$. The relative indexes of the central segment and the three annular segments are, central segment 30, $\Delta_0\%$, about 0.55%, first annular segment 32, $\Delta_1\%$, about −0.08%, second annular segment 34, $\Delta_2\%$, about 0.2%, and third annular segment 36, $\Delta_3\%$, about −0.1%. Using the conventions set forth in FIGS. 1–3, and referring to FIG. 4, the respective radii are outer radius 38, $r_0$, about 4.5 μm, outer radius 40, $r_1$, about 7 μm, outer radius 42, $r_2$, about 9.5 μm, center radius 44, $r_3$, about 15 μm, and third annular segment width 46, $w_3$, about 10.5 μm. The properties of fiber made in accord with the profile of FIG. 4 are set forth in Table 4.

TABLE 4

| | |
|---|---|
| Zero-dispersion wavelength (nm) | 1496.0 |
| Dispersion slope (ps/nm² · km) | 0.0778 |
| Mode field diameter (μm) | 9.78 |
| Effective area (μm²) | 73.0 |
| Cable cutoff wavelength (nm) | 1230 |
| Pin array bending loss (dB/km) | 4.2 |
| Lateral load bending loss (dB/m) | 0.562 |

The group of profiles in accord with FIG. 4 which provide substantially the same fiber parameters as set forth in Table 4 have respective relative indexes $\Delta_0\%$ in the range of about 0.5% to 0.6%, $\Delta_1\%$ in the range of about −0.02% to −0.08%, $\Delta_2\%$ in the range of about 0.15% to 0.25%, and $\Delta_3\%$ in the range of about −0.07% to −0.15%. The respective radial dimensions are $r_0$ in the range of about 4.0 µm to 5.5 µm, the outer radius of the first annular segment $r_1$ in the range of about 6.0 µm to 7.0 µm, the outer radius of the second annular segment $r_2$ in the range of about 8.5 µm to 10.0 µm, the center radius of the third annular segment $r_3$ in the range of about 13.5 µm to 16.0 µm, and the width of the third annular segment $w_3$ in the range of about 9.5 µm to 11.5 µm.

Figure 5:
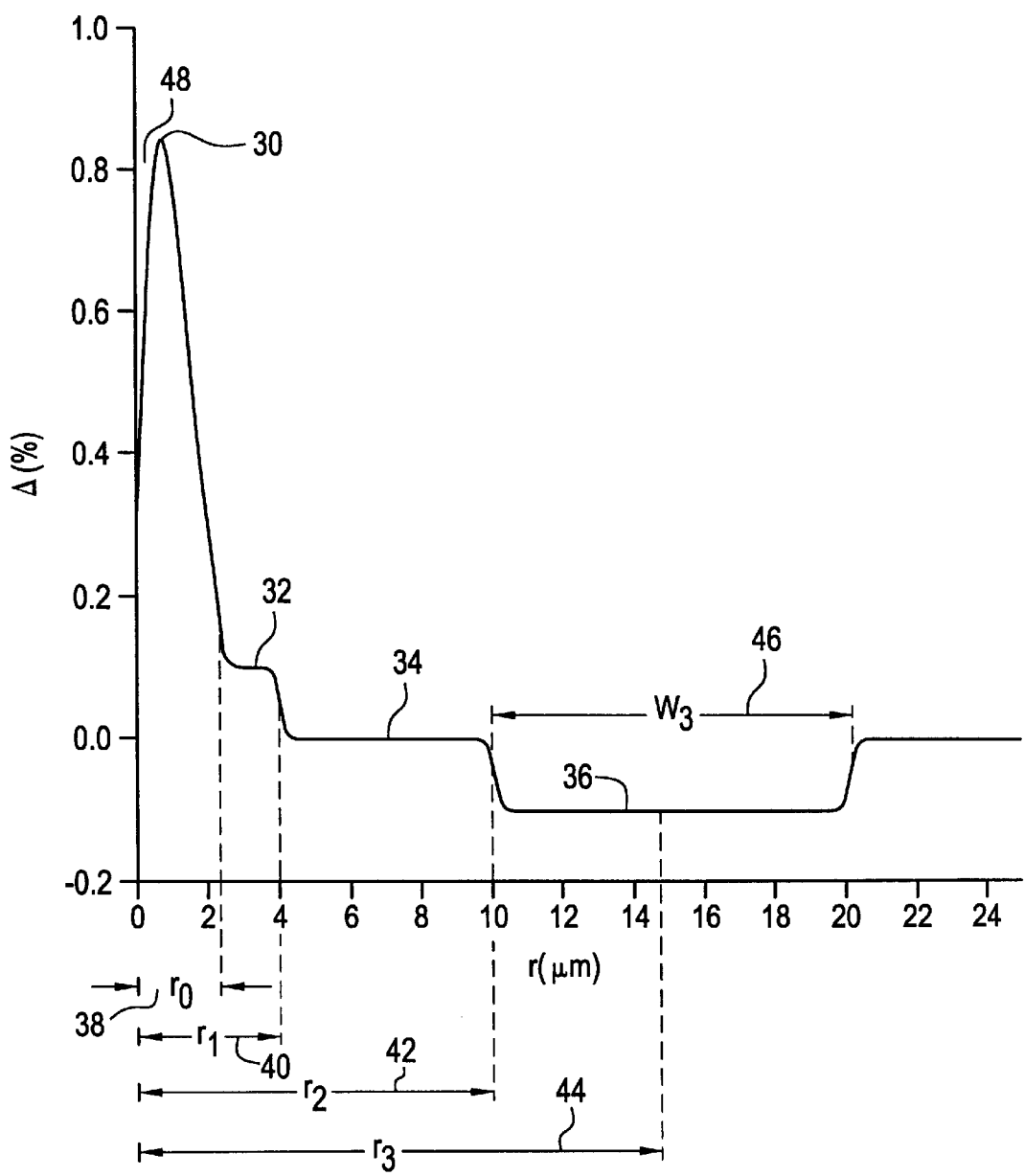
FIG. 5 is an example of a waveguide fiber refractive index profile having a four segment core and a negative relative index in the third annular segment.

Yet another embodiment is shown in FIG. 5. The numbering of the core segments and the radii are the same as set forth in FIG. 4 and thus will not be repeated. The relative indexes are described by the inequality $\Delta_0\% > \Delta_1\% > \Delta_2\% > \Delta_3\%$. The third annular segment has a negative relative index. The parameters of a fiber made in accord with FIG. 5 are set forth in Table. 5. The respective relative indexes are $\Delta_0\%$ about 0.82%, $\Delta_1\%$ about 0.1%, $\Delta_2\%$ about 0, and $\Delta_3\%$ about −0.1%.

TABLE 5

| | |
|---|---|
| Zero-dispersion wavelength (nm) | 1484.2 |
| Dispersion slope (ps/nm² · km) | 0.0753 |
| Mode field diameter (µm) | 10.0 |
| Effective area (µm²) | 74.1 |
| Cable cutoff wavelength (nm) | 1260 |
| Pin array bending loss (dB/km) | 4.1 |
| Lateral load bending loss (dB/m) | 0.458 |

The group of profiles in accord with FIG. 5 which provide substantially the same fiber parameters as set forth in Table 5 have respective relative indexes $\Delta_0\%$ in the range of about 0.7% to 0.9%, $\Delta_1\%$ in the range of about 0.05% to 0.15%, $\Delta_2\%$ in the range of about 0 to 0.10%, and $\Delta_3\%$ in the range of about −0.02% to −0.15%. The respective radial dimensions are, $r_0$ in the range of about 2.0 µm to 3.5 µm, the outer radius of the first annular segment $r_1$ in the range of about 3.5 µm to 4.5 µm, the outer radius of the second annular segment $r_2$ in the range of about 9.0 µm to 11.0 µm, the center radius of the third annular segment $r_3$ in the range of about 15.0 µm to 16.0 µm, and the width of the third annular segment $W_3$ in the range of about 9.0 µm to 11.0 µm.

Figure 6:
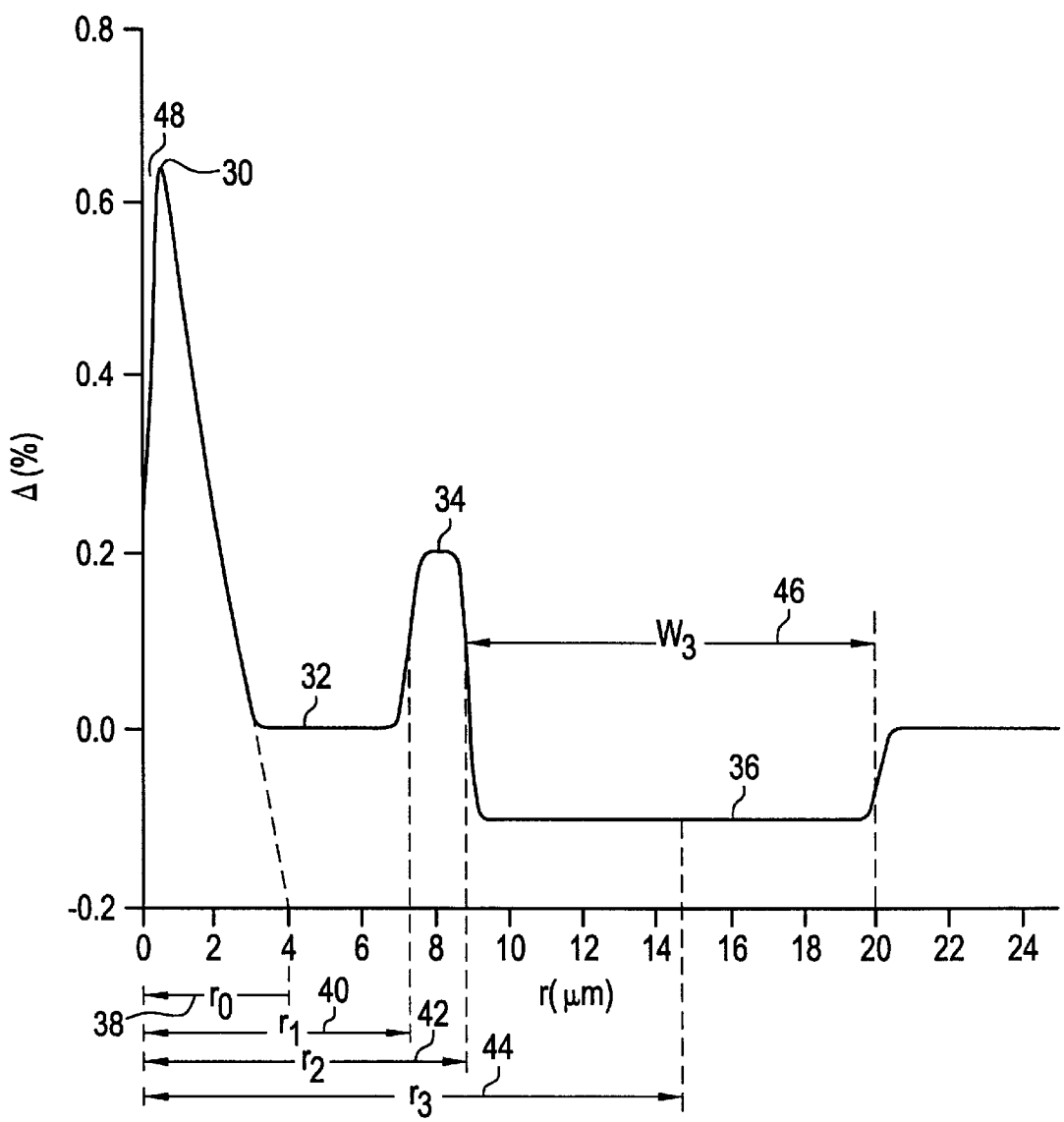
FIG. 6 is an example of a waveguide fiber refractive index profile having a four segment core and a negative relative index in the third annular segment.

Another embodiment of the invention having three annular segments is shown in FIG. 6. The third annular segment has a negative relative index. The relative refractive indexes of the respective segments have magnitudes in accord with the inequality $\Delta_0\% > \Delta_2\% > \Delta_1\% > \Delta_3\%$. The numbered parts of FIG. 6 are the same as that for FIG. 4 and thus the will not be further discussed here.

In FIG. 6, $\Delta_0\%$ is about 0.63%, $\Delta_1\%$ is about 0, $\Delta_2\%$ is about 0.2%, and $\Delta_3\%$ is about −0.1%. The radii are $r_0$ about 4 µm, $r_1$ 7.5 µm, $r_2$ about 8.5 µm, center radius $r_3$ is about 14.5 µm, and width of the final segment is about 11.5 µm. The properties of the waveguide fiber having this refractive index profile are set forth in Table 6.

TABLE 6

| | |
|---|---|
| Zero-dispersion wavelength (nm) | 1497.0 |
| Dispersion slope (ps/nm² · km) | 0.0850 |
| Mode field diameter (µm) | 9.78 |
| Effective area (µm²) | 72.2 |
| Cable cutoff wavelength (nm) | 1300 |
| Pin array bending loss (dB/km) | 1.8 |
| Lateral load bending loss (dB/m) | 0.518 |

The group of profiles in accord with FIG. 6 which provide substantially the same fiber parameters as set forth in Table 6 have respective relative indexes $\Delta_0\%$ in the range of about 0.55 to 0.7%, $\Delta_1\%$ in the range of about 0 to 0.10%, $\Delta_2\%$ in the range of about 0.15 to 0.25%, and $\Delta_3\%$ in the range of about −0.05% to −0.17%. The respective radial dimensions are, $r_0$ in the range of about 3.5 µm to 5.5 µm, the outer radius of the first annular segment $r_1$ in the range of about 6.0 µm to 8.0 µm, the outer radius of the second annular segment $r_2$ in the range of about 8.0 µm to 10.0 µm, the center radius of the third annular segment $r_3$ in the range of about 15.5 µm to 16.5 µm, and the width of the third annular segment $W_3$ in the range of about 10.0 µm to 13.0 µm.

Figure 7:
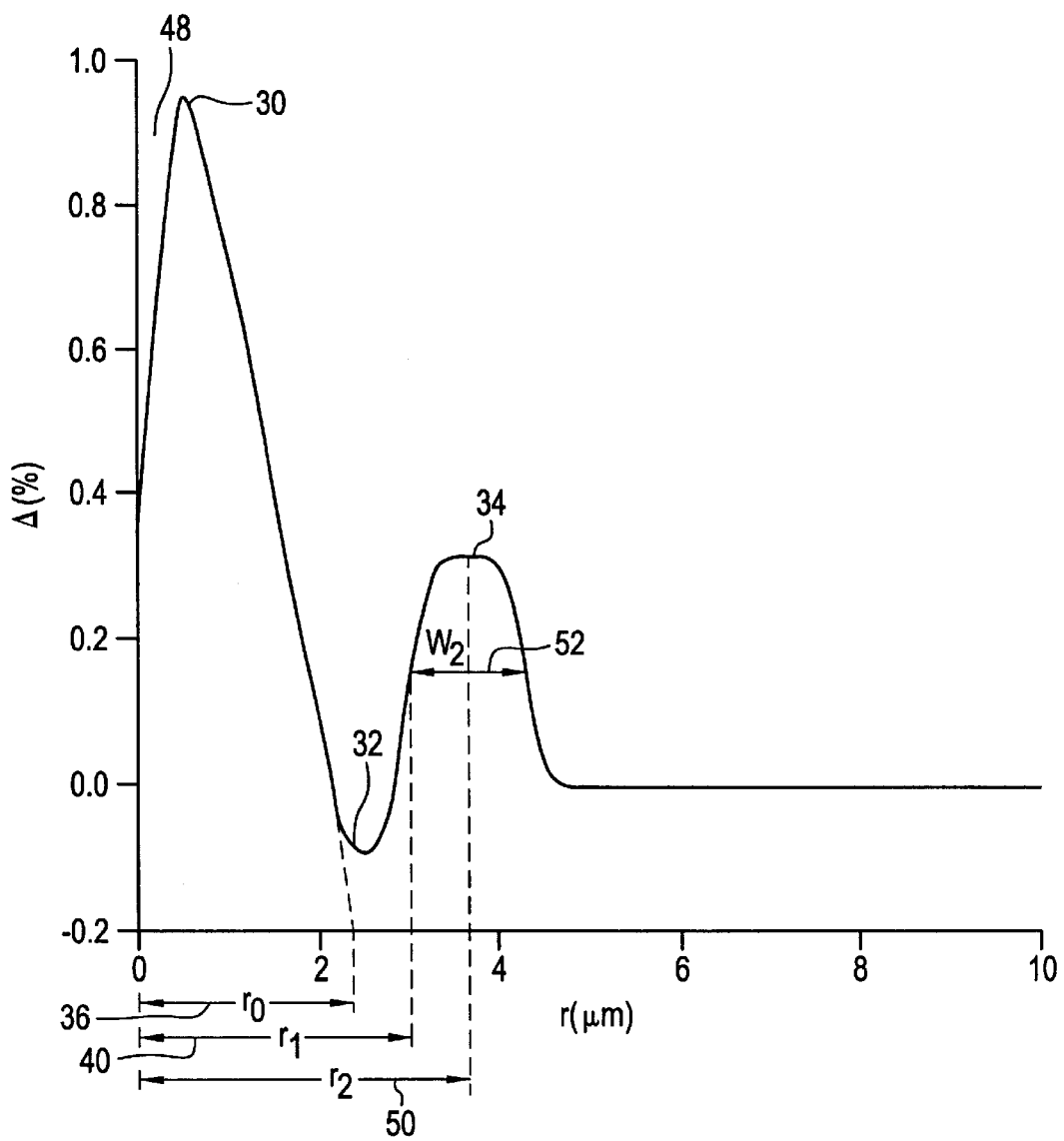
FIG. 7 is an example of a waveguide fiber refractive index profile having a three segment core and a negative relative index in the first annular segment.

Yet another embodiment, having two annular segments, is shown in FIG. 7. The first annular segment has a negative relative index. The respective relative indexes have magnitudes in accord with the inequality $\Delta_0\% > \Delta_2\% > \Delta_1\%$. Referring to FIG. 7, central segment 30 has $\Delta_0\%$ about 0.95% and outer radius 38, $r_0$, about 2.3 µm, first annular segment 32 has $\Delta_1\%$ about −0.1% and outer radius 40, $r_1$, about 3 µm, and second annular segment 34 has $\Delta_2\%$ about 0.3%, center radius 50, $r_2$, about 3.75 µm, and width 52, $w_2$, about 1.25 µm. The properties of the waveguide fiber having a refractive index profile in accord with FIG. 7 are set forth in Table 7.

TABLE 7

| | |
|---|---|
| Zero-dispersion wavelength (nm) | 1492.0 |
| Dispersion slope (ps/nm² · km) | 0.085 |
| Mode field diameter (µm) | 9.75 |
| Effective area (µm²) | 73.5 |
| Cable cutoff wavelength (nm) | 1200 |
| Pin array bending loss (dB/km) | 7.5 |
| Lateral load bending loss (dB/m) | 0.442 |

The group of profiles in accord with FIG. 7 which provide substantially the same fiber parameters as set forth in Table 7 have respective relative indexes $\Delta_0\%$ in the range of about 0.7% to 0.9%, $\Delta_1\%$ in the range of about −0.05 to −0.15%, and, $\Delta_2\%$ in the range of about 0 to 0.35%. The respective radial dimensions are, $r_0$ in the range of about 2.5 µm to 3.5 µm, the outer radius of the first annular segment $r_1$ in the range of about 2.75 µm to 3.75 µm, the center radius of the second annular segment $r_2$ in the range of about 3.0 µm to 4.0 µm, and the width of the second annular segment $w_2$ in the range of about 1.0 µm to 2.0 µm.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

I claim:
1. A single mode optical waveguide fiber, comprising:
 a core region having a central segment and at least a first annular segment surrounding the central segment, each said segment having a refractive index profile and an inner and outer radius; and,
 a clad layer having a refractive index profile;
 wherein at least one segment of said core region has a minimum refractive index less than the minimum refractive index of said clad layer, and,
 the respective refractive index profiles and radii of the central segment and the at least one annular segment are selected to provide single mode optical waveguide fiber having an effective area greater than about 70 µm², a total dispersion slope less than about 0.09 ps/nm²-km, and positive total dispersion over wavelengths greater than about 1500 nm, and, the induced attenuation due to pin array bending is less than about 12 dB/km and preferably less than about 8.0 dB/km.

2. The single mode optical waveguide fiber of claim 1 wherein the dispersion slope is less than 0.08 ps/nm²-km.

3. The single mode optical waveguide fiber of claim 1 wherein the induced attenuation due to pin array bending is less than about 5.0 dB/km.

4. The single mode optical waveguide fiber of any one of claims 1, 2 or 3 wherein the induced attenuation due to lateral load is less than about 1.2 dB/km and preferably less than about 0.6 dB/m.

5. The single mode optical waveguide fiber of claim 1 wherein each core segment has a relative refractive index $\Delta_i\%$, the subscript i referring to a particular segment, the central segment having subscript 0 and the successive annular segments having consecutive number subscripts beginning with 1 for the first annular segment, and the central segment has a relative refractive index, $\Delta_0\%$, that is negative.

6. The single mode optical waveguide fiber of claim 5 wherein $\Delta_0\%$ is in the range of about $-0.05\%$ to $-0.8\%$.

7. The single mode optical waveguide fiber of claim 6 wherein the relative index of the first annular segment, $\Delta_1\%$, is in the range of about 0.8% to 1.5%.

8. The single mode optical waveguide fiber of any one of claims 5–7 wherein the outer radius $r_0$ of the central segment is in the range of about 0.5 μm to 2 μm.

9. The single mode optical waveguide fiber of any one of claims 5–7 wherein the outer radius $r_0$ of the central segment is in the range of about 0.5 μm to 2 μm and the outer radius of the first annular region $r_1$ is in the range of about 3.5 μm to 5.5 μm.

10. The single mode optical waveguide fiber of claim 5 including a first and a second annular segment wherein the second annular segment has a relative index $\Delta_2\%$ which is negative.

11. The single mode optical waveguide fiber of claim 10 wherein $\Delta_0\%$ is in the range of about $-0.05\%$ to $-0.2\%$, $\Delta_1\%$ is in the range of about 1.3% to 1.5%, and $\Delta_2\%$ is in the range of about $-0.05\%$ to $-0.2\%$.

12. The single mode fiber of claim 11 wherein $r_0$ is in the range of about 1 μm to 3 μm, the outer radius of the first annular segment $r_1$ is in the range of about 4 μm to 6 μm, the center radius of the second annular segment is in the range of about 11.5 μm to 12.5 μm, and the width of the second annular segment $w_2$ is in the range of about 15 μm to 17 μm.

13. The single mode optical waveguide fiber of claim 5 including a first, a second, and a third annular segment wherein the second annular segment has a relative index $\Delta_2\%$ which is negative and the third annular segment has relative index $\Delta_3\%$ which is positive and the relative indexes of the segment are selected such that $\Delta_1\%>\Delta_3\%>\Delta_2\%\geq\Delta_0\%$.

14. The single mode optical waveguide fiber of claim 13 wherein $\Delta_0\%$ is in the range of about $-0.05\%$ to $-0.2\%$, $\Delta_1\%$ is in the range of about 0.85% to 1.15%, $\Delta_2\%$ is in the range of about $-0.05\%$ to $-0.2\%$, and $\Delta_3\%$ is in the range of about 0.3% to 0.5%.

15. The single mode fiber of claim 14 wherein the radius of the central segment $r_0$ is in the range of about 0.05 μm to 1.5 μm, the outer radius of the first annular segment $r_1$ is in the range of about 3 μm to 5 μm, the outer radius of the second annular segment is in the range of about 5.5 μm to 7.0 μm, the center radius of the third annular segment is in the range of about 6.25 μm to 8.25 μm and the width of the third annular segment $w_3$ is in the range of about 1.5 μm to 2.5 μm.

16. The single mode waveguide fiber of claim 1 including three annular segments wherein each core segment has a relative refractive index $\Delta_i\%$, the subscript i referring to a particular segment, the central segment having subscript 0 and the successive annular segments having consecutive number subscripts beginning with 1 for the first annular segment, and wherein the relative indexes of the first and third annular segments are negative and the relative indexes of the segment are selected such that $\Delta_0\%>\Delta_2\%>\Delta_1\%>\Delta_3\%$.

17. The single mode optical waveguide fiber of claim 16 wherein $\Delta_0\%$ is in the range of about 0.5% to 0.6%, $\Delta_1\%$ is in the range of about $-0.02\%$ to $-0.08\%$, $\Delta_2\%$ is in the range of about 0.15% to 0.25%, and $\Delta_3\%$ is in the range of about $-0.07\%$ to $-0.15\%$.

18. The single mode fiber of claim 17 wherein $r_0$ is in the range of about 4.0 μm to 5.5 μm, the outer radius of the first annular segment $r_1$ is in the range of about 6.0 μm to 7.0 μm, the outer radius of the second annular segment $r_2$ is in the range of about 8.5 μm to 10.0 μm, the center radius of the third annular segment is in the range of about 13.5 μm to 16.0 μm and the width of the third annular segment $w_3$ is in the range of about 9.5 μm to 11.5 μm.

19. The single mode waveguide fiber of claim 1 including three annular segments wherein each core segment has a relative refractive index $\Delta_i\%$, the subscript i referring to a particular segment, the central segment having subscript 0 and the successive annular segments having consecutive number subscripts beginning with 1 for the first annular segment, and wherein the relative index of the third annular segment is negative and the relative indexes of the segment are selected such that $\Delta_0\%>\Delta_1\% >\Delta_2\%>\Delta_3\%$.

20. The single mode optical waveguide fiber of claim 19 wherein $\Delta_0\%$ is in the range of about 0.7% to 0.9%, $\Delta_1\%$ is in the range of about 0.05% to 0.15%, $\Delta_2\%$ is in the range of about 0 to 0.10%, and $\Delta_3\%$ is in the range of about $-0.02\%$ to $-0.15\%$.

21. The single mode fiber of claim 20 wherein $r_0$ is in the range of about 2.0 μm to 3.5 μm, the outer radius of the first annular segment $r_1$ is in the range of about 3.5 μm to 4.5 μm, the outer radius of the second annular segment $r_2$ is in the range of about 9.0 μm to 11.0 μm, the center radius of the third annular segment is in the range of about 15 μm to 16.0 μm, and the width of the third annular segment $w_3$ is in the range of about 9 μm to 11 μm.

22. The single mode waveguide fiber of claim 19 wherein the relative indexes of the segment are selected such that $\Delta_0\%>\Delta_2\%>\Delta_1\%>\Delta_3\%$.

23. The single mode optical waveguide fiber of claim 22 wherein $\Delta_0\%$ is in the range of about 0.55 to 0.7%, $\Delta_1\%$ is in the range of about 0 to 0.10%, $\Delta_2\%$ is in the range of about 0.15 to 0.25%, and $\Delta_3\%$ is in the range of about $-0.05\%$ to $-0.17\%$.

24. The single mode fiber of claim 23 wherein $r_0$ is in the range of about 3.5 μm to 5.5 μm, the outer radius of the first annular segment $r_1$ is in the range of about 6 μm to 8 μm, the outer radius of the second annular segment is in the range of about 8 μm to 10 μm, the center radius of the third annular segment is in the range of about 15.5 μm to 16.5 μm, and the width of the third annular segment $w_3$ is in the range of about 10 μm to 13 μm.

25. The single mode waveguide fiber of claim 1 including two annular segments wherein each core segment has a relative refractive index $\Delta_i\%$, the subscript i referring to a particular segment, the central segment having subscript 0 and the successive annular segments having consecutive number subscripts beginning with 1 for the first annular segment, and wherein the relative index of the first annular segment is negative and the relative indexes of the segment are selected such that $\Delta_0\% > \Delta_2\% > \Delta_1\%$.

26. The single mode optical waveguide fiber of claim 25 wherein $\Delta_0\%$ is in the range of about 0.7% to 0.9%, $\Delta_1\%$ is in the range of about −0.05% to −0.15%, and $\Delta_2\%$ is in the range of about 0 to 0.35.

27. The single mode fiber of claim 26 wherein $r_0$ is in the range of about 2.5 μm to 3.5 μm, the outer radius of the first annular segment $r_1$ is in the range of about 3.5 μm to 4 μm, and the center radius of the third annular segment is in the range of about 3 μm to 4 μm, and the width of the second annular segment $w_2$ is in the range of about 1 μm to 2 μm.

* * * * *